(12) United States Patent
Ullmann

(10) Patent No.: US 7,305,874 B2
(45) Date of Patent: Dec. 11, 2007

(54) MICROMECHANICAL PRESSURE SENSOR ELEMENT AND METHOD FOR USING A PRESSURE SENSOR ELEMENT OF THIS TYPE

(75) Inventor: Dirk Ullmann, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/472,106

(22) Filed: Jun. 20, 2006

(65) Prior Publication Data

US 2006/0288789 A1 Dec. 28, 2006

(30) Foreign Application Priority Data

Jun. 23, 2005 (DE) .................... 10 2005 029 097

(51) Int. Cl.
*B60C 23/02* (2006.01)

(52) U.S. Cl. ..................................... 73/146.5; 340/442

(58) Field of Classification Search ................. 73/753, 73/146.5

See application file for complete search history.

(56) References Cited

U.S. PATENT DOCUMENTS 6,894,600 B2 * 5/2005 Phelan .................... 340/10.34
6,945,103 B1 * 9/2005 Lee et al. ................... 73/146.5
7,034,672 B2 * 4/2006 Dinello et al. .............. 340/447
7,212,104 B2 * 5/2007 Haswell et al. ............. 340/442
2003/0221481 A1 * 12/2003 Von Wendorff .............. 73/146
2007/0125161 A1 * 6/2007 Bryzek et al. ............. 73/146.4

FOREIGN PATENT DOCUMENTS

DE 100 32 579 1/2002

* cited by examiner

*Primary Examiner*—Andre J. Allen
(74) *Attorney, Agent, or Firm*—Kenyon & Kenyon LLP

(57) ABSTRACT

A micromechanical pressure sensor element, in particular for tire pressure measurement. The device has at least: a layer system having a diaphragm underneath which a cavity is formed, which is separated from an external space outside the pressure sensor element; a measuring device for measuring a deflection of the diaphragm; and a seismic mass formed on, underneath, or in the diaphragm. Furthermore, in a method for using such a pressure sensor element, the pressure sensor element is operable in a sleep mode having lower power consumption and in an operating mode having higher power consumption; in the sleep mode a change in the measuring signals of the measuring device over time is checked, and if a relevant change in the measuring signals is detected, a position change is inferred and a switchover to the operating mode is performed, in which the measuring signals of the measuring device or the analysis signals formed from the measuring signals are transmitted via a transmitter, for example, an antenna.

5 Claims, 3 Drawing Sheets

MICROMECHANICAL PRESSURE SENSOR ELEMENT AND METHOD FOR USING A PRESSURE SENSOR ELEMENT OF THIS TYPE

FIELD OF THE INVENTION

The present invention relates to a micromechanical pressure sensor element, which is usable in particular for measuring tire pressure, and a method for using a pressure sensor element of this type for activating an operating mode.

BACKGROUND INVENTION

In general, micromechanical pressure sensor elements are formed on a substrate or a chip by forming a diaphragm having a cavity on the top of the substrate or chip by underetching. A measuring device which determines a pressure differential between the cavity and an outer space as a deflection of the diaphragm is formed in the diaphragm, for example by piezoelectric resistors. Pressure sensor elements of this type may be conventionally manufactured using bulk micromechanics or surface micromechanics (SMM).

German Patent Application No. DE 100 32 579 describes a cost-effective manufacturing method for a pressure sensor element manufactured using surface micromechanics, in which coarse pores are initially formed, so that a sponge-like or lattice-like structure is obtained, on which a monocrystalline epitaxial layer is formed and subsequently heat-treated for the later diaphragm, forming a large-volume cavity underneath the diaphragm. This may take place in a protective hydrogen atmosphere which then diffuses from the cavity through the diaphragm, leaving behind a vacuum, so that the diaphragm is exposed to the absolute pressure of the external space.

Pressure sensor elements of this type are generally used for tire pressure measurement by bonding the sensor chip onto a substrate, a printed circuit board, for example, and installing it, for example, in the area of the tire valve. The tire pressure sensor is provided with a dedicated voltage source, in general a galvanic element, and transmits measuring signals or analysis signals derived therefrom to an external receiver in the vehicle via an antenna. However, continuous operation of the tire pressure sensor entails high power consumption, which strongly reduces the service life of the tire pressure sensor.

SUMMARY OF THE INVENTION

The pressure sensor element according to the present invention and the method according to the present invention have several advantages over the related art.

According to the present invention, an acceleration sensor is integrated in the pressure sensor element. This is achieved, according to the present invention, at small additional expense in manufacturing by connecting a seismic mass to the diaphragm, i.e., by mounting a seismic mass in or on the diaphragm. With the aid of the diaphragm and its measuring device, both the pressure and the acceleration are measured as a superimposed signal. An inventive idea is that the start of rotation of the vehicle tire is recognizable by a position change of the sensor element, during which the component of the gravitational force which is normal to the diaphragm changes. This change may be detected in a sleep mode using little power, so that an operating mode in which power consumption is higher may be activated for further measurement, data processing, and transmitting measuring and/or analysis signals via the antenna.

According to the method of the present invention, the frequency and/or amplitude of the measuring signal is/are advantageously examined. The underlying idea is that activation should occur when the tire starts rotating, at which time the rotational speed is low and the changes in the measuring signal take place in a low-frequency range. Furthermore, the acceleration signal of the seismic mass and of the intrinsic mass of the diaphragm has a lower intensity than the pressure signal on which it is superimposed, so that only changes in the amplitude value below a certain limiting value are to be considered for recognizing the rotation of the tire during a start.

The method may be switched again from the operating mode to the sleep mode when it is recognized in the operating mode that the measuring signal no longer changes in successive measurements. The extra cost for the additional acceleration detection is thus essentially that of the additional seismic mass, which may be applied on the top as a solder bump or may be formed in the micromechanical manufacturing process via mass regions, e.g., $SiO_2$ regions, in or underneath the diaphragm.

DETAILED DESCRIPTION

Figure 1:
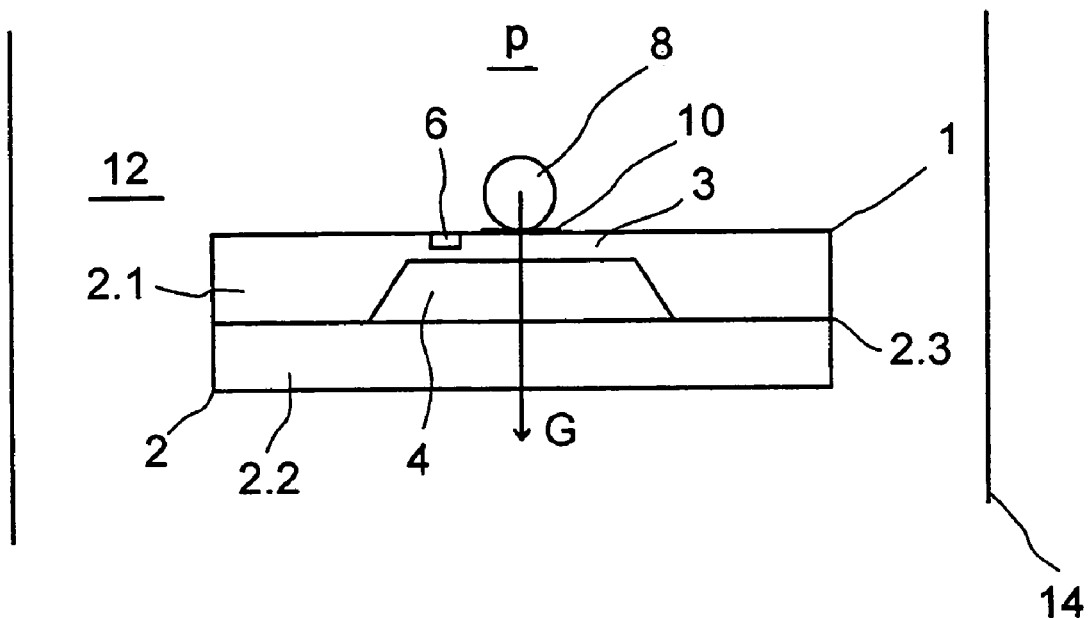
FIG. 1 shows a cross section of a pressure sensor element according to the present invention according to a first embodiment.

According to FIG. 1, a sensor element 1 has a layer system 2 made up, for example, of p-doped silicon having an n-doped diaphragm 3 underneath which a cavity 4 is formed. One or more piezoeletric resistors 6 are formed in diaphragm 3, for example, as p-doping in n-doped diaphragm 3. Piezoelectric resistors 6 are used as measuring devices for measuring the deflection of diaphragm 3; in principle, other measuring devices, for example, piezoelectric elements, may also be provided. Piezoelectric resistors 6 are read via conductors (not illustrated), which are formed as more highly doped regions in layer system 2. The resistance of piezoelectric resistors 6 may be measured, for example, in a Wheatstone bridge.

A seismic mass 8 is applied to diaphragm 3. In the embodiment shown, seismic mass 8 is formed by a solder bump. For better adhesion, a receiving surface 10 is formed on diaphragm 3, for example, galvanized as a metal surface for better adhesion of solder bump 8.

In the embodiment of FIG. 1, layer system 2 is formed by bulk micromechanics using at least one upper monocrystalline layer 2.1 and at least one lower monocrystalline layer 2.2. Cavities 4 are formed in a first wafer by KOH etching from the top—thus from below in FIG. 1—until diaphragms 3 remain and the etching process is stopped. Subsequently a second wafer is secured in a bonding layer 2.3 by anodic bonding, for example, for second layers 2.2 on the top side of the first wafer, and seismic masses 8 are applied, so that a wafer stack is obtained, from which sensor elements 1 may be obtained directly by dicing. In principle, layer system 2 may also be subdivided in the horizontal direction.

No passages or openings are formed in diaphragm 3. Cavity 4 is thus separated from an external space 12 surrounding sensor element 1. Piezoelectric resistors 6 thus measure a deflection corresponding to the pressure differential between external space 12 and cavity 4. A gas or gas mixture is preferably provided in cavity 4 to keep the pressure differential and thus the mechanical stress on diaphragm 3 low. As an alternative, a vacuum may also be formed in cavity 4, so that only external pressure p of external space 12 is acting on one side. Furthermore, force of gravity G acts upon diaphragm 3 via seismic mass 8 and the intrinsic weight of diaphragm 3. In the horizontal orientation of sensor element 1 shown, this force of gravity G acts perpendicularly to the plane of diaphragm 3, i.e., in the same direction as the force exerted by external pressure p of external space 12. In a tilted arrangement of sensor element 1, force of gravity G does not generally act on diaphragm 3 in an orthogonal direction, so that only the vector component perpendicular to diaphragm 3 contributes to the measuring signal of piezoelectric resistors 6, i.e., force of gravity G multiplied by the cosine of the angle between the normal to the surface and the vertical direction of the force of gravity.

The measuring signal of piezoelectric resistors 6 is thus a function of the orientation of sensor element 1. According to the present invention, sensor element 1 is used as a tire pressure sensor element, so that the inner space of vehicle tire 14 forms external space 12. As soon as the vehicle starts rolling, vehicle tire 14 begins to rotate, so that—initially in the low-frequency range of a few Hertz—the position and orientation of sensor element 1 changes periodically, which, for a tire pressure p which initially remains constant, may be interpreted as a change in the normal component of force of gravity G.

Figure 2:
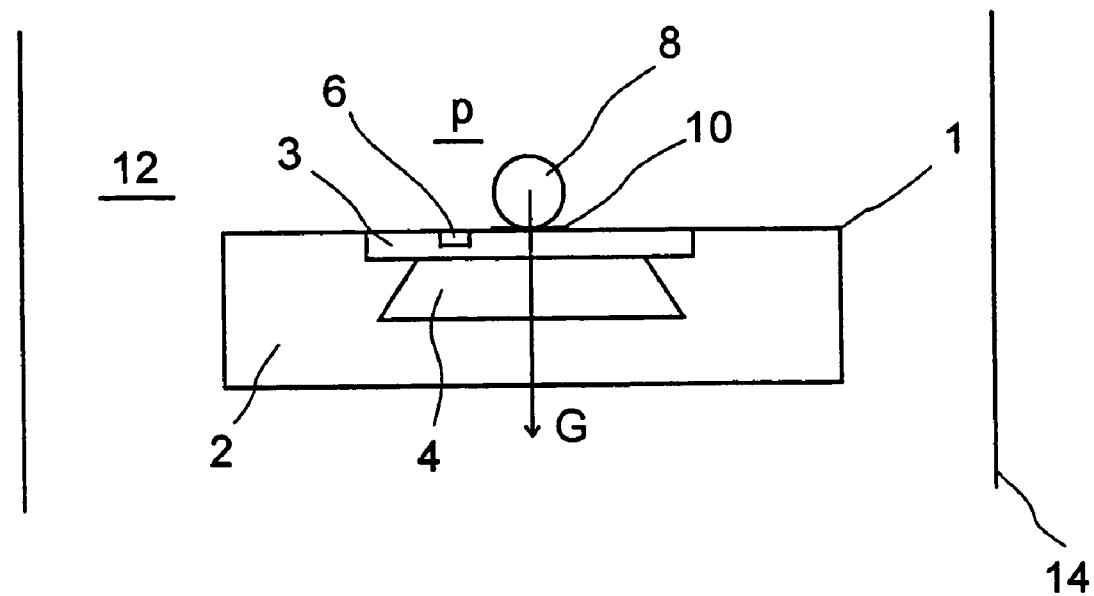
FIG. 2 shows a cross section of a pressure sensor element according to the present invention according to a second embodiment.

Alternatively to the embodiment of FIG. 1, diaphragm 3 may be formed according to FIG. 2 by the SMM (surface micromechanical) process described in German Patent Application No. DE 100 32 579, in which pores, or a sponge-like or lattice-like structure, are formed in a monocrystalline substrate 2 using etching gas or etching liquid, and an epitaxial layer corresponding to the subsequent diaphragm is deposited thereon. In this embodiment, cavity 4 is formed by subsequent heat treatment of the porous material underneath diaphragm 3 at 300° to 1200° C., for example, for several hours. Alternatively, an epitaxial layer corresponding to diaphragm 3 may also be initially deposited on substrate 2, and etching openings or fine pores are subsequently formed in the epitaxial layer in the area of later diaphragm 3, the etching agent, e.g., the etching gas, e.g., hydrogen fluoride HF or a liquid for etching silicon, being introduced through the pores into the bulk material under it to form cavity 4. The etching openings in diaphragm 3 may subsequently be closed by applying a cover layer to diaphragm 3.

Figure 3:
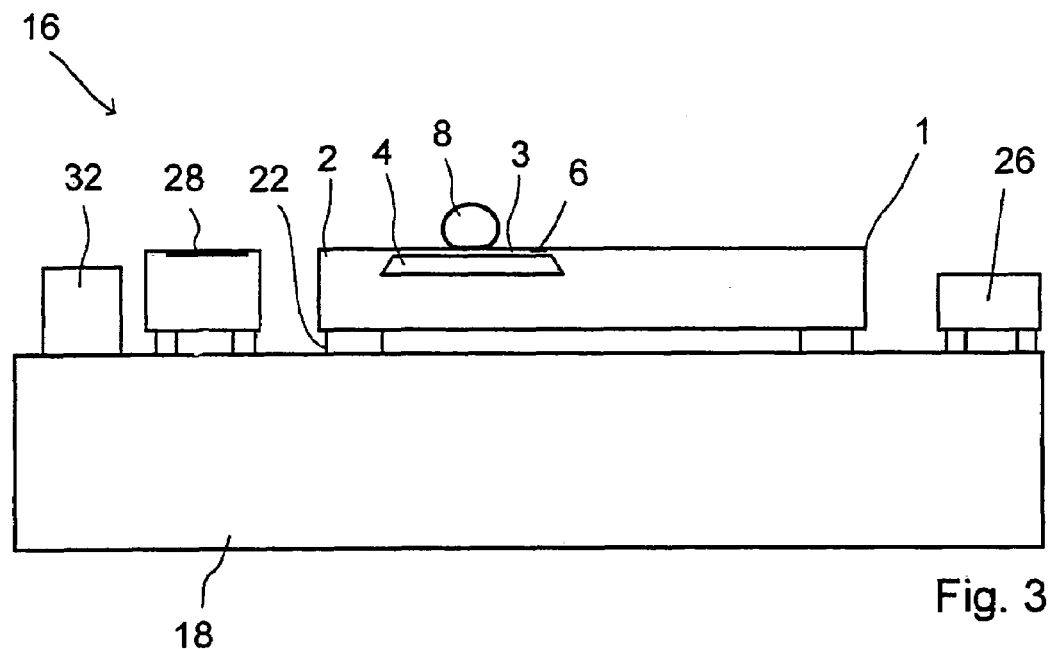
FIG. 3 shows a cross section of a sensor module constructed on a pc board, having the pressure sensor element from FIG. 1 or 2.

FIG. 3 shows the bonding of sensor element 1 from FIG. 1 or 2. A sensor module 16 is formed by attaching sensor element 1 onto a pc board 18 used as the assembly substrate. It is bonded, as shown, via bonding agent areas 22 or solder bumps 22 or conductive glue areas 22, and plated holes or also via wire bonds.

Figure 4:
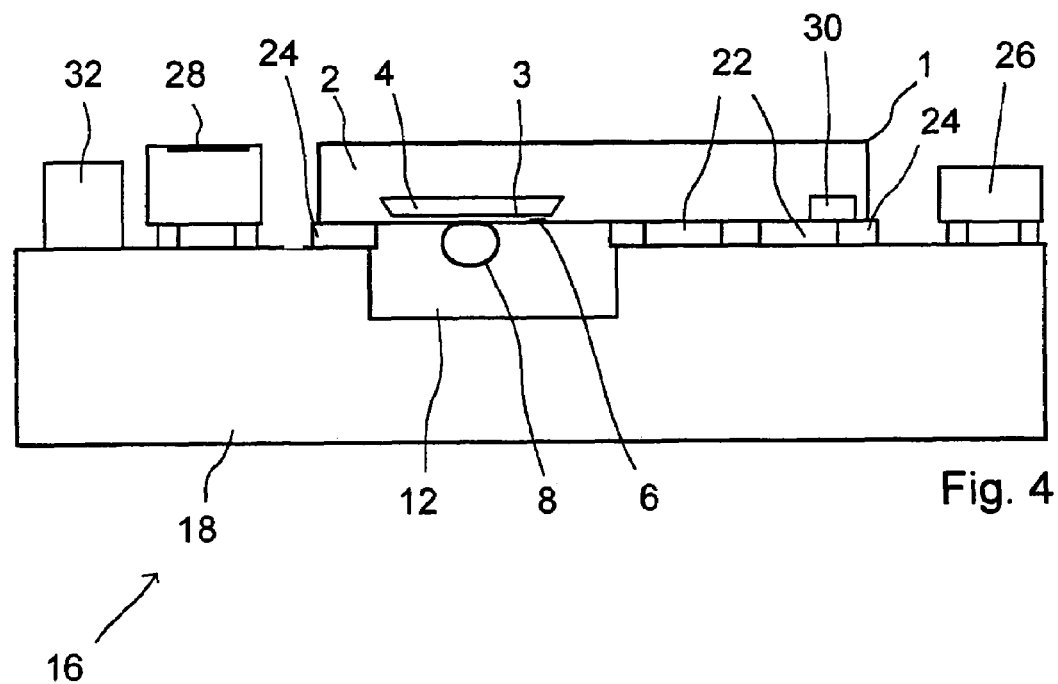
FIG. 4 shows a cross section of a sensor module constructed on a pc board, having the pressure sensor element of FIG. 1 or 2 installed using flip-chip technology.
Figure 5:
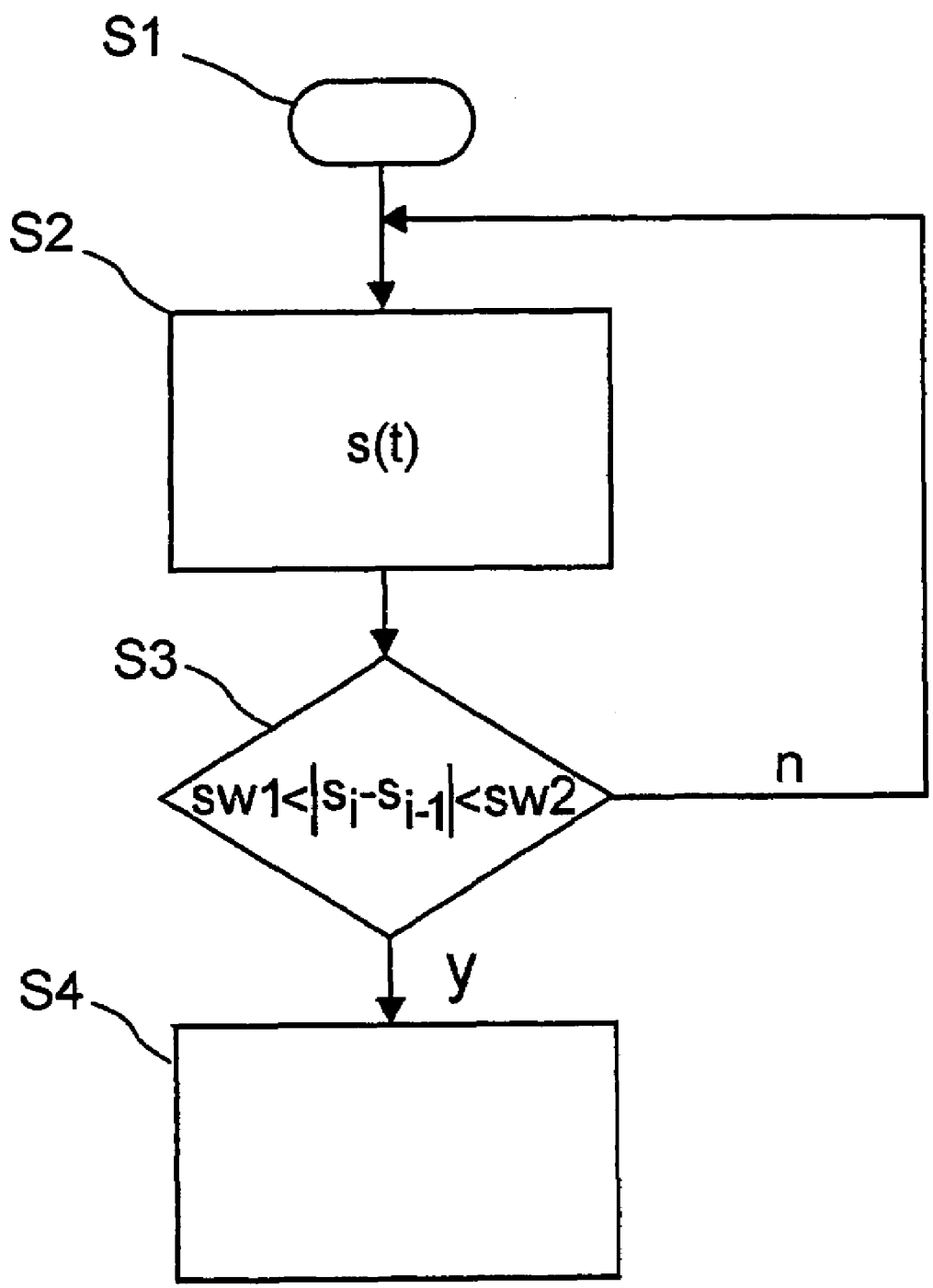
FIG. 5 shows a flow chart of the method according to the present invention.

FIG. 4 shows another embodiment in which a recess is formed, e.g., cut, on the top of pc board 18 as external space 12. Sensor element 1, i.e., the sensor chip, is attached to the top of pc board 18 using flip-chip technology, i.e., in reverse order with its SMM machined top downward. Solder bumps 22 are applied for bonding, together with seismic mass 8, between sensor element 1 and pc board 18, before mounting sensor element 1 onto pc board 18. An underfiller 24 may be additionally introduced between sensor element 1 and pc board 18.

The measuring signals of piezoelectric resistors 6 may be analyzed by an additional ASIC 26 or an analyzer circuit 30 formed in the sensor chip, i.e., sensor element 1. Furthermore, an antenna 28 may also be formed, for example, on another chip and bonded via pc board 18.

FIG. 3 shows the method according to the present invention in a flow chart. Initial step S1 takes place at the time sensor module 16 is installed in vehicle tire 14. Since sensor module 16 relies only on its energy accumulator 32, for example, a galvanic cell, for power supply, according to step S2 it initially remains in a sleep mode, consuming a minimum of power, while the vehicle is at a standstill. Measuring signals s of piezoelectric resistors 6 are read on an ongoing basis, for example, in clocked time intervals, in sleep mode S2. In decision step S3, the system checks whether a relevant change over time in the measured acceleration or pressure signal has occurred.

For this purpose, time derivation is performed, or differences of successive measured values $s_i$ and si-1 are formed. According to the present invention, they may be checked for whether their absolute value exceeds a first threshold value sw1 or is less than a second threshold value sw2. sw1 is used to determine that a significant signal change beyond the measuring noise has occurred; sw2 is used to differentiate, with respect to the changes in effective external pressure p, which has a greater contribution to measuring signal s. According to the present invention, alternatively or additionally, the frequency range of the signal change may also be examined, since, when starting, lower wheel speeds and thus low-frequency changes in the range below 10 Hz, for example, are to be expected.

If a relevant change in position has been recognized, the method is reset according to branch y before step S2, i.e., sensor module 16 remains in sleep mode.

If this is not the case, the operating mode is switched on according to branch n in step S4, in which internal tire pressure p, i.e., the pressure in external space 12, is determined and measuring signals or analysis signals are emitted outward via antenna 28.

What is claimed is:

1. A method for using a pressure sensor element comprising:
   operating the pressure sensor element in a sleep mode having lower power consumption and in an operating mode having higher power consumption;
   checking, in the sleep mode, a change over time in at least one measuring signal of a measuring device; and
   if a relevant change in the measuring signal is detected, inferring a position change and performing a switchover to the operating mode, in which one of (a) the measuring signal of the measuring device and (b) at least one analysis signal formed from the measuring signal is transmitted by a transmitting device.

2. The method according to claim 1, wherein the transmitting device includes an antenna.

3. The method according to claim 1, further comprising, in the sleep mode, analyzing changes in the measuring signal in a low-frequency range of less than 10 Hz, and recognizing changes in the measuring signal in the low-frequency range as a position change of the sensor element.

4. The method according to claim 1, further comprising, in the sleep mode, recognizing changes in the measuring signal of the measuring device over a limiting value as a position change of the sensor element.

5. The method according to claim 1, wherein the pressure sensor element is used for measuring an internal tire pressure.

* * * * *